Oct. 21, 1930.   R. H. LAWSON   1,778,901
MECHANICAL MOVEMENT
Filed May 4, 1928   7 Sheets-Sheet 1

Inventor:
Robert H. Lawson,
by Emery Booth Janney Varney
Attys

Oct. 21, 1930.  R. H. LAWSON  1,778,901
MECHANICAL MOVEMENT
Filed May 4, 1928   7 Sheets-Sheet 2

Oct. 21, 1930.  R. H. LAWSON  1,778,901
MECHANICAL MOVEMENT
Filed May 4, 1928  7 Sheets-Sheet 3

Inventor:
Robert H. Lawson
by Emery Booth Janney Varney
Attys.

Oct. 21, 1930.  R. H. LAWSON  1,778,901
MECHANICAL MOVEMENT
Filed May 4, 1928  7 Sheets-Sheet 4
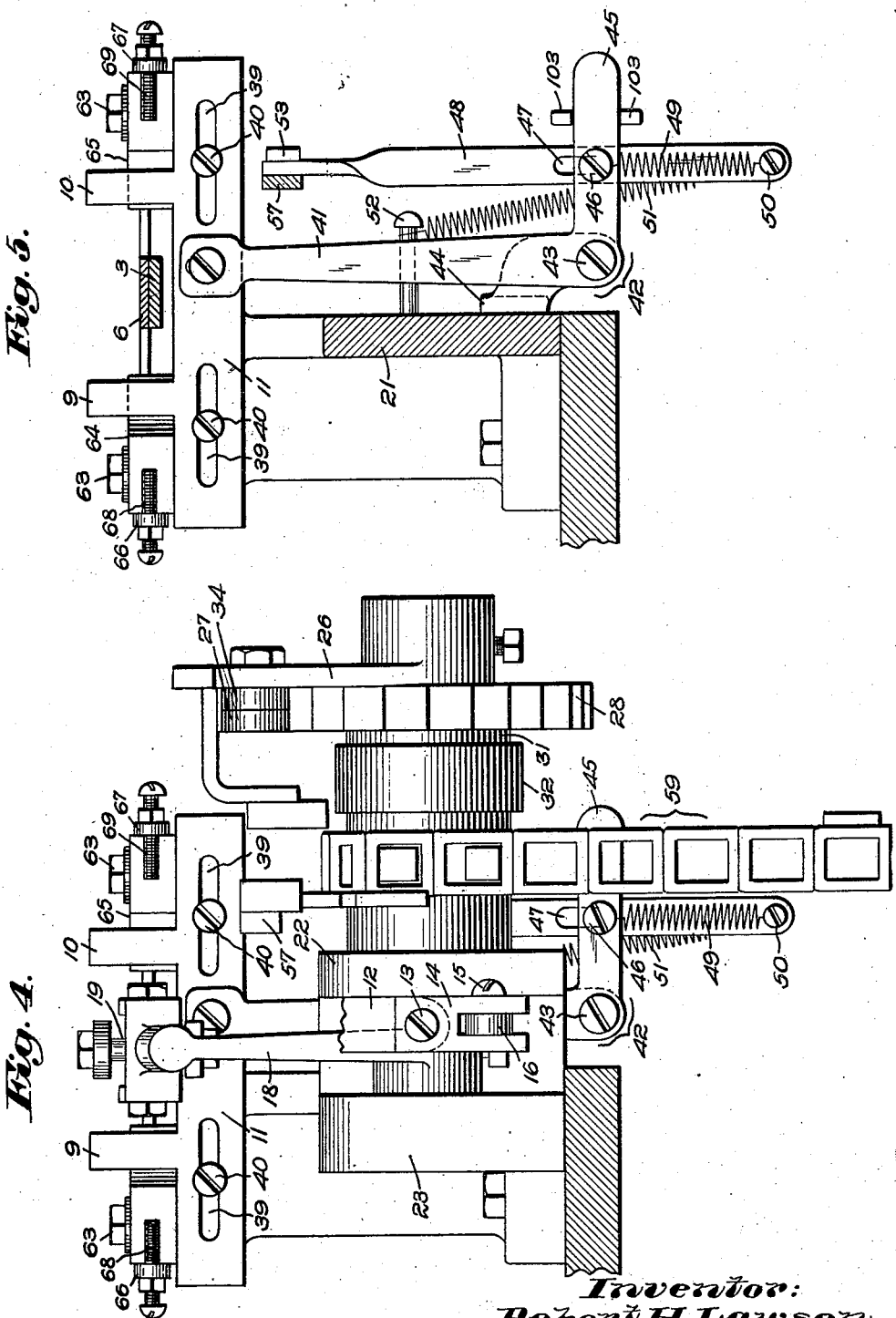

Oct. 21, 1930.  R. H. LAWSON  1,778,901
MECHANICAL MOVEMENT
Filed May 4, 1928  7 Sheets-Sheet 5
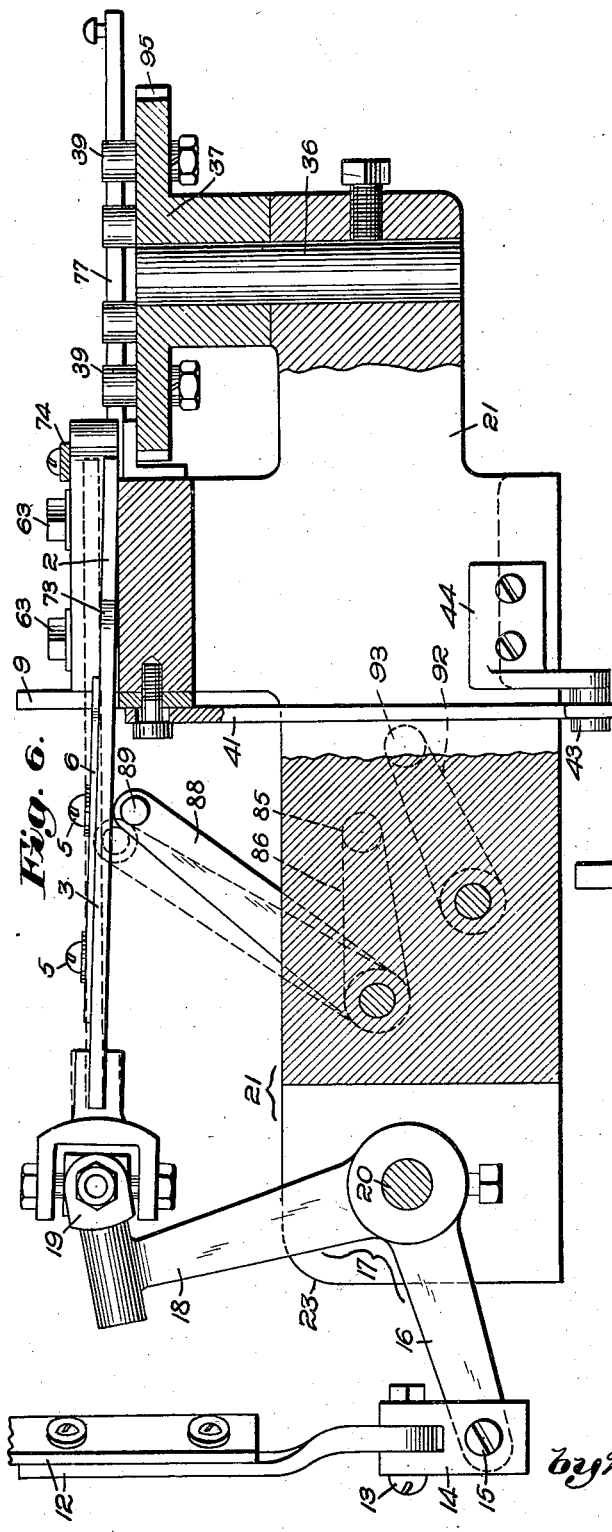
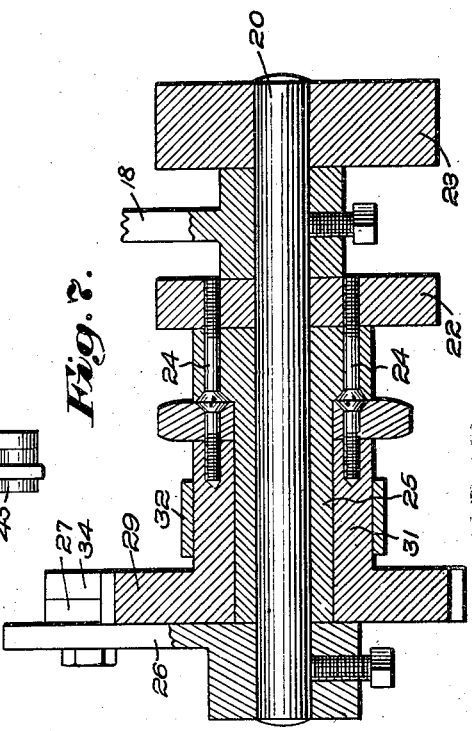
Inventor:
Robert H. Lawson,
by Emery Booth, Janney Varney
Attys.

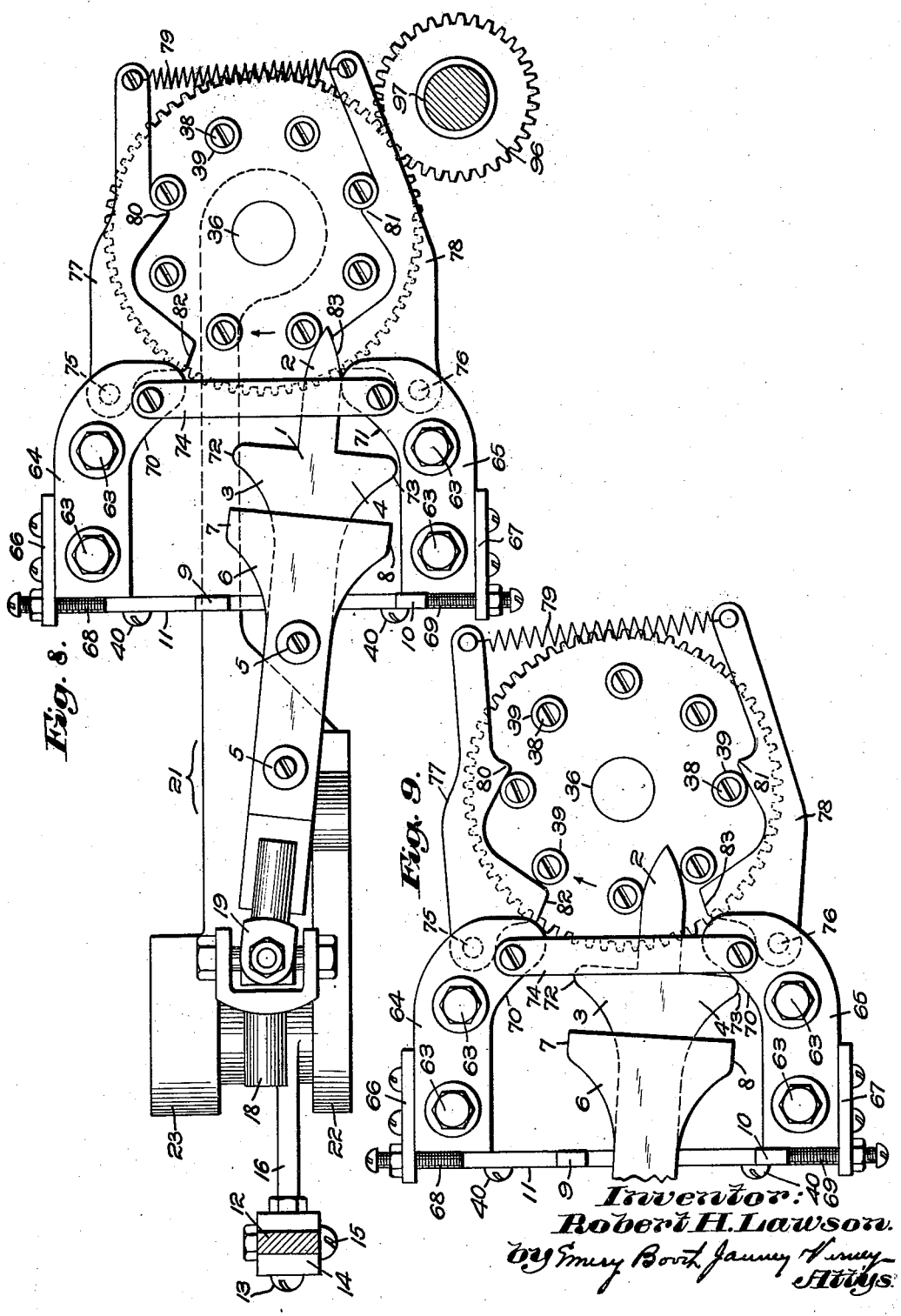

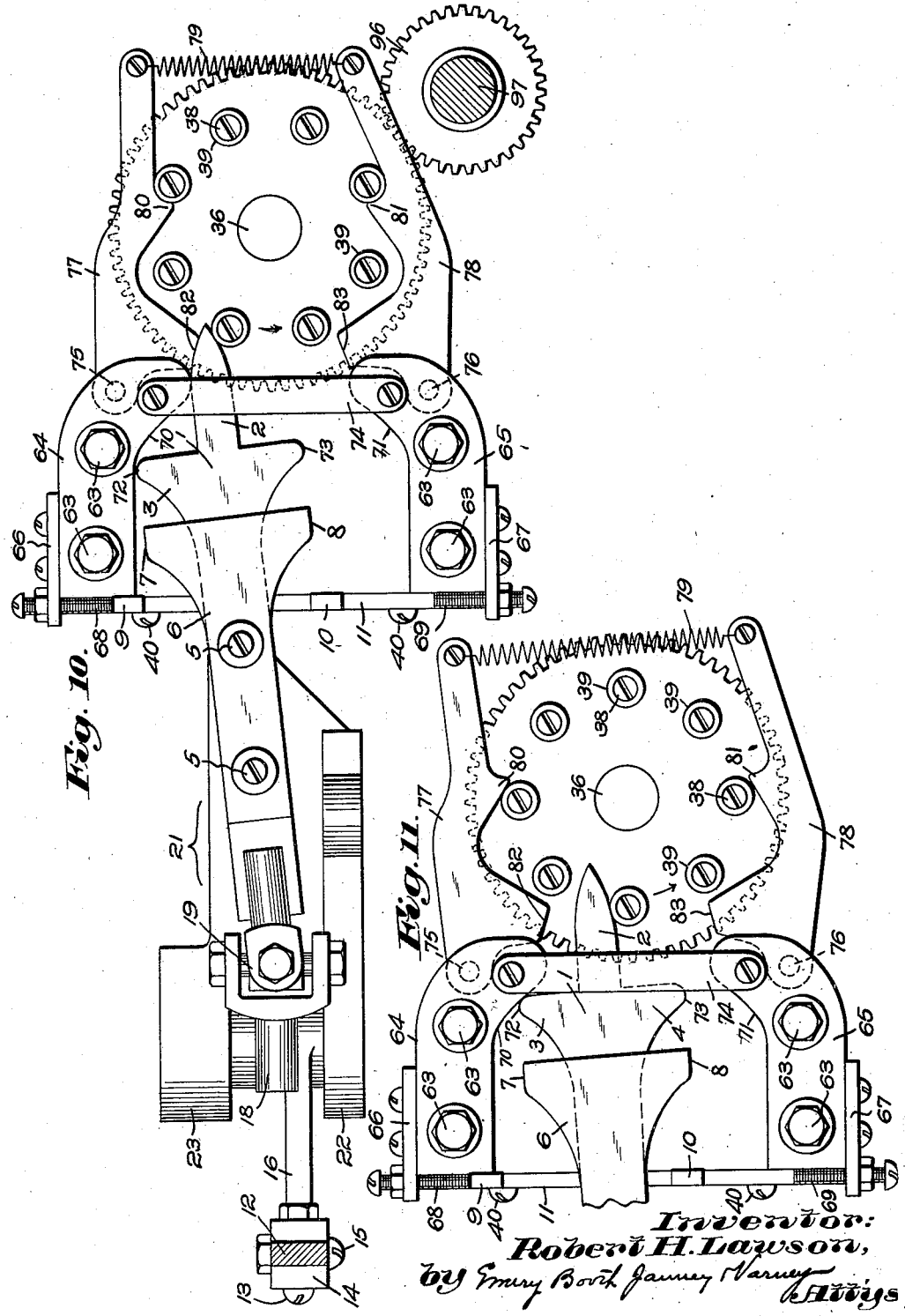

Patented Oct. 21, 1930

1,778,901

UNITED STATES PATENT OFFICE

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS

MECHANICAL MOVEMENT

Application filed May 4, 1928. Serial No. 275,075.

This invention relates to mechanical movements and is of general application.

In order that the principle of the invention may be readily understood, I have disclosed a single embodiment thereof in the accompanying drawings, wherein—

Fig. 4 is an end elevation of the mechanism shown in Fig. 1;

Fig. 5 is a vertical transverse section upon the line 5—5 of Fig. 1;

Fig. 6 is a longitudinal section on the line 6—6 of Fig. 1;

Fig. 7 is a vertical transverse section on the line 7—7 of Fig. 2;

Fig. 8 is a plan view similar to Fig. 1 but omitting certain of the parts, and showing the to and fro movable element acting to turn the rotary element in a clockwise direction;

Fig. 9 is a view similar to Fig. 8, but showing the movement of the rotary element in a clockwise direction, further advanced;

Fig. 10 is a view similar to Fig. 8, but representing the to and fro movable element as acting to turn the rotary element in a contraclockwise direction; and Fig. 11 is a view similar to Fig. 9 but representing the continuation of the movement of the rotary element in a contraclockwise direction.

Figure 1:
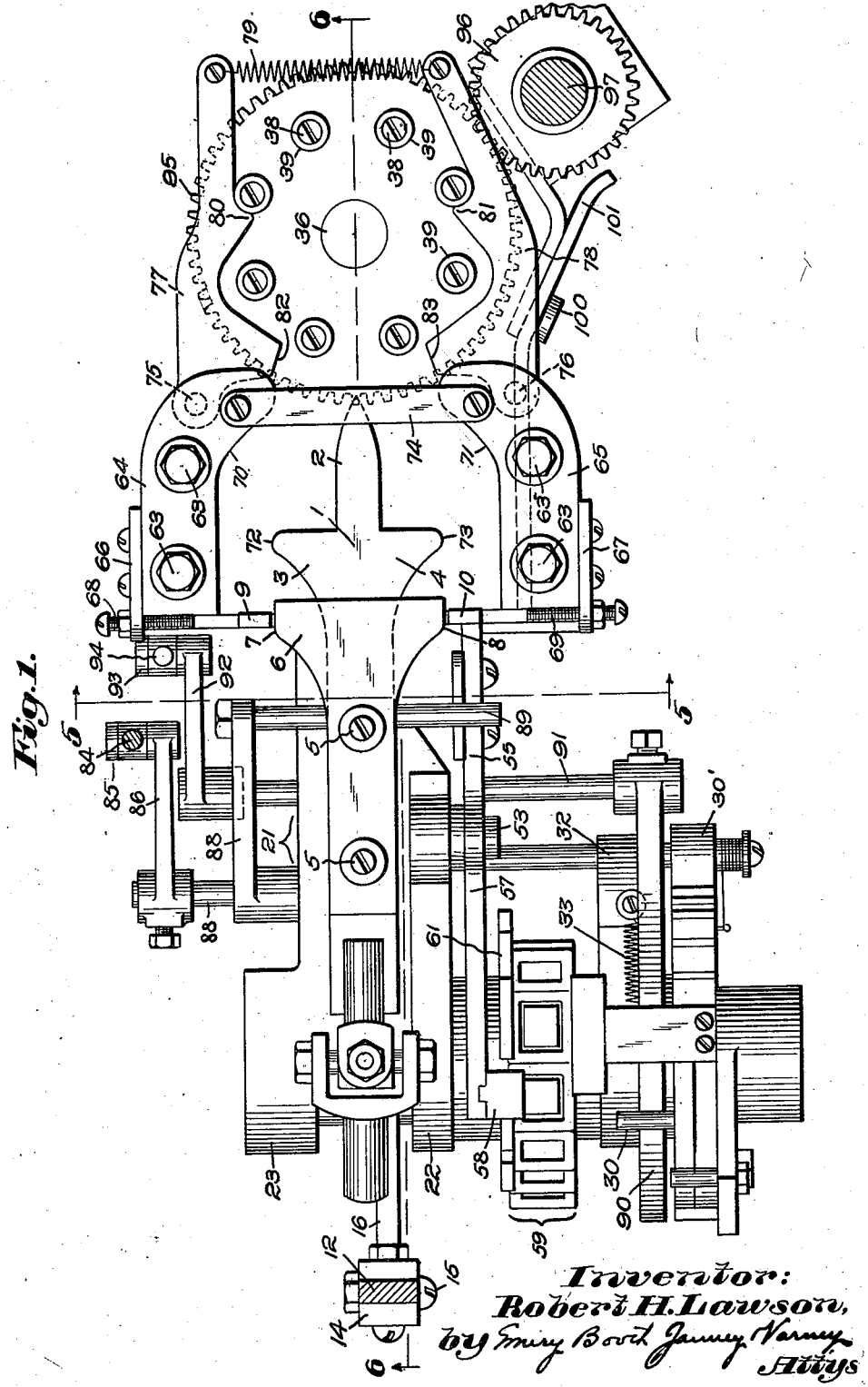
Fig. 1 is a plan view of the selected embodiment of my invention.

In accordance with my invention, I impart a to and fro movement to an element which imparts a step-by-step movement to a rotatory element. Said step-by-step rotatory movement is, in accordance with my invention, imparted in either direction as long as desired, or said to and fro movable element may continue its movement, but idly, because said to and fro movable element and the rotary element have been relatively separated; that is, by movement of one of said elements, they are brought into non-functioning relation.

The to and fro movable element, in the disclosed embodiment of my invention, is reciprocated in a right line, but it is to be understood that the selected disclosure of my invention is merely for illustrative purposes, and that the principle of my invention may be practised in other ways. I shall describe the disclosed embodiment of my invention, but without limiting myself thereto, excepting as specifically stated in the claims.

The to and fro movable element is indicated in the various figures at 1. It is provided with a pointed or tongue or arrow shaped end 2 having two opposite functioning faces or edges and in the rear thereof with opposite lateral projections 3, 4, the function whereof will be hereinafter described. Formed, if desired, with the element 1, but in the present instance shown as secured thereto by bolts 5, is an overlying part 6 which is relatively broad compared with the pointed or tongue-like end 2.

The sides 7, 8 of the part 6 are adapted to be engaged by uprights 9, 10, upon a transversely movable slide 11, to be referred to more particularly hereinafter.

Any suitable means may be employed to impart to and fro movement to the element 1. Herein for the purpose, and referring more particularly to Fig. 2, I have represented a link or rod 12 which, at the lower end thereof, is pivotally connected at 13 to a short link or member 14 that is in turn pivoted at 15 to the arm 16 of bell crank lever 17, the other arm 18 whereof is connected by a universal joint 19 to the end of the to and fro movable element 1.

Figure 2:
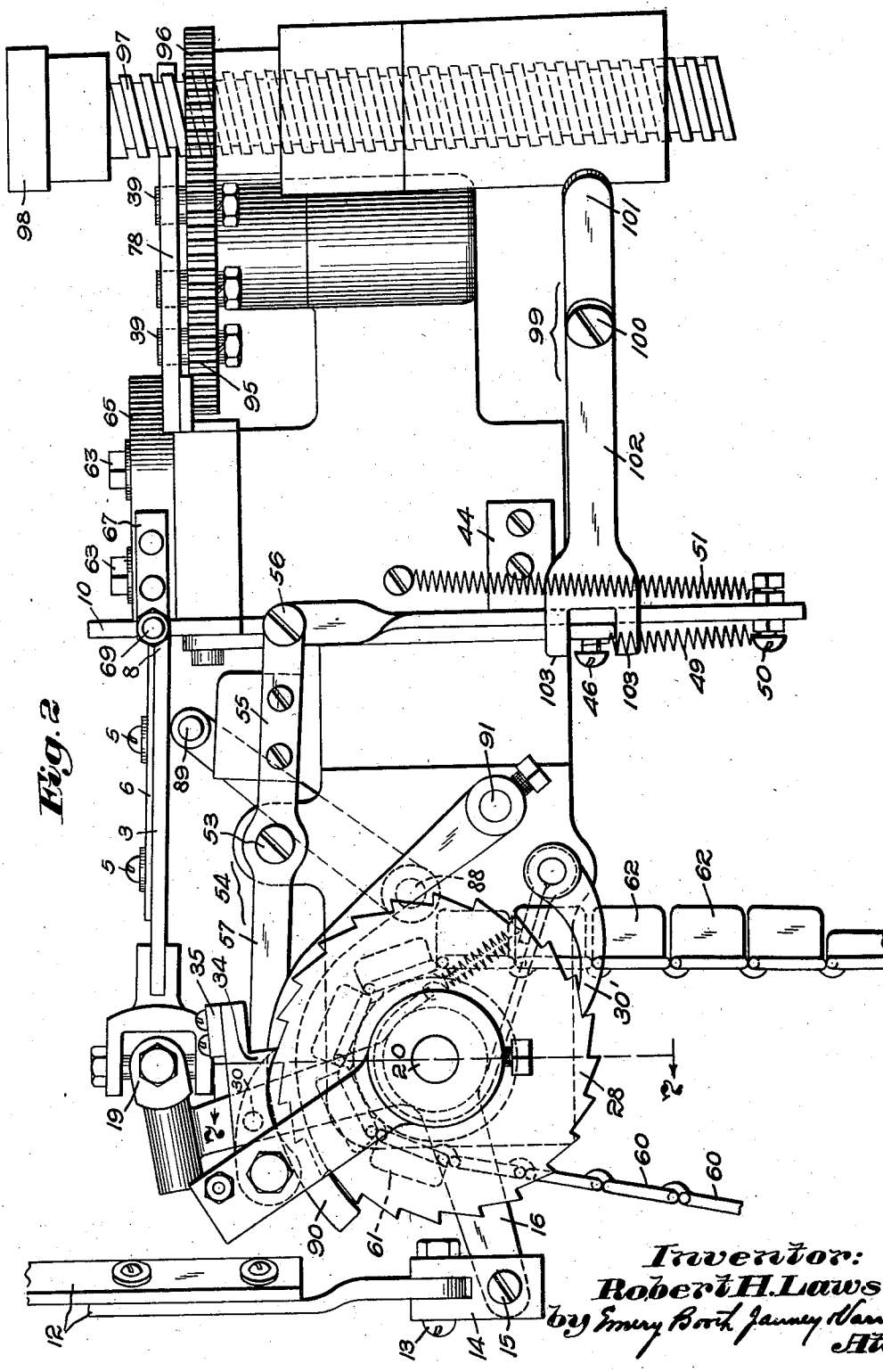
Fig. 2 is a side elevation thereof looking from the front or right hand side of Fig. 1.

The bell crank lever 17 is fast upon a short shaft 20 suitably mounted in the framing or casting 21. For this purpose, there is provided a two-part bearing shown at 22, 23 in Fig. 7. Secured by bolts 24 to the bearing part 22 is a sleeve 25 through which the shaft 20 extends and wherein it is rotatable. Fast upon the shaft 20 is an arm or lever 26 which, as shown in dotted lines in Fig. 2, is provided with a pawl 27 of usual shape and adapted to engage the teeth 28 of a ratchet 29 that is free to rotate upon the sleeve 25. The pawl 27 is provided with a laterally extending pin 30, the function of which will be hereinafter stated. A hold-back pawl 30' is preferably provided as shown.

The hub 31 of the ratchet 29 is surrounded by a brake band 32, shown also in Fig. 1, and the ends whereof are suitably connected by a spring 33. At the side of the pawl 27, shown also in Fig. 7, is a second pawl 34, a cross piece 35 whereof is engaged by the pawl 27 when lifted out of action by means hereinafter described, so as to lift said second pawl also out of engagement with the ratchet 29. The lifting of said pawls out of engagement with the ratchet may occur at predetermined times in accordance with the requirements or conditions of the mechanism to which my invention is applied.

Fast in the frame or casting 21 is an upright stud 36, shown most clearly in Fig. 6. Free to turn in either direction upon said stud is a toothed disk 37 which will be referred to as the rotatory member, and, which in accordance with my invention, the to and fro movable member 1 turns in either direction in accordance with the dictates of the controlling parts. Extending from the upper face of the rotatory member or disk 37 are a series of pins or bolts 38, here shown as eight in number, and each carrying a small roller 39 to reduce wear. The said pins 38 are equally distributed about the face of the disk 37. Viewing Fig. 1, it will be evident that so long as the element 1 reciprocates or moves to and fro in a line which intersects the axis of rotation of the disk 37 (that is, the shaft 36 or axis thereof) the disk 37 is not turned in either direction. If, however, said element 1 is moved laterally to one side or the other of the axis of rotation of the disk 37, the continued movement of the element 1 imparts a step-by-step movement to the disk 37 in a clockwise direction or in a contraclockwise direction, according to the side of the axis of the disk 37 to which the said element 1 has been shifted.

Referring to Figs. 8 and 9, it will be evident that when the said element 1 has been shifted to the right hand side of said disk, viewing Figs. 8 and 9, said to and fro movements of the element 1 turn the disk 37 in a clockwise direction. It will be evident from Figs. 10 and 11 that when the element 1 is shifted to the opposite side of the axis of the disk 37, the said disk will be turned step by step in a contraclockwise direction by the to and fro movements of the element 1.

In order to shift the element 1 transversely, any suitable means may be employed. Herein for the purpose the slide 11 is employed. The said slide, as shown most clearly in Figs. 4, 5 and 6, is provided with longitudinal slots 39 through which bolts or screws 40 extend into the framing. Suitably secured to said slide 11 is the arm 41 of a bell crank lever 42 pivoted at 43 upon a bracket 44 secured to the framing. The arm 45 of said bell crank lever 42 has therein a screw 46 which extends through a longitudinal slot 47 in a link 48. Preferably I provide a coiled spring 49 connected to the screw 46 and to a screw 50 at the lower end of the link 48, the function whereof is to hold the slide 11 steady, as will be evident from the further description of the mechanism. I also provide a coiled spring 51 connected to the screw 50 and to a screw or pin 52 attached to the framing. The purpose of said coiled spring 51 is to elevate or tend to elevate the link 48.

Movement is imparted to the link 48, and consequently to the slide 11, in the present disclosure of my invention, in the following manner.

Pivoted upon the framing at 53, as indicated most clearly in Fig. 2, is a lever 54, the arm 55 whereof is pivotally connected at 56 to the link 48. The other arm 57 of said lever 54 has secured thereto a block or lateral extension 58, shown most clearly in Fig. 1, which rides upon the links of a pattern chain, generally indicated at 59 in the several views. Certain of the links of said pattern chain are devoid of lugs, such, for example, as the plain link 60. Others of said links have low lugs 61 and still other links have high lugs 62. Therefore, the lever 54 is rocked in accordance with the character of the links of the pattern chain. If a link is presented to the lever 54 which is provided with a low lug, such as 61, the to and fro movable element 1 is brought into a neutral position; that is, into the central position shown in Fig. 1. If a link (such as 60) is presented, that is devoid of a lug, the slide 11 is moved to the left viewing Figs. 5, 8 or 10 and the disk 37 is turned in a contraclockwise direction. If a link having a high lug 62 is presented to the lever 54, the slide 11 is moved to the right viewing Fig. 5 and the disk 37 is turned in a clockwise direction.

It is to be understood that any other suitable means may be employed to move, desirably automatically, the element 1 transversely, so that it may act upon the pins 38 upon the face of the disk 37, to one side or the other of the axis of said disk.

Referring more particularly to Figs. 1 and 8 to 11, it will be noted that suitably secured to the framing by bolts 63 are two members 64, 65 transversely to which the slide 11 is moved to and fro, as already described. The framing or, if desired, the said members 64, 65 are provided with straps or brackets 66, 67, wherein are tapped adjusting screws 68, 69, against which the projections 9, 10 of the slide 11 take, and whereby the length of to and fro movements of said slide 11 may be slightly varied or adjusted as found necessary.

The inner edges of said members 64, 65 are cam shaped, as indicated at 70, 71, in the several figures. The cam formation may be varied as found suitable. In the disclosed embodiment of the invention, the construction is such that the edges 70, 71 converge or approach each other, and are adapted to be engaged respectively by the edges 72, 73 of the laterally projecting parts 3, 4 of the element 1. If desired, and as shown, the two members 64, 65 may have connected thereto a strap 74 under which the element 1 moves to and fro.

Pivoted respectively to the members 64, 65 at 75, 76 are two levers 77, 78, the ends whereof are connected by a coil spring 79. Said levers 77, 78 constitute one form or type of holding or limiting means to prevent over movement of the disk or rotatory member 37.

As shown in the several views, the levers 77, 78 are provided with shoulders 80, 81 which are adapted to be engaged by the pins 38 or the rolls 39 thereof, as clearly indicated, and whereby the extent of each step-by-step movement is limited. Said levers 77, 78 are also provided with shoulders 82, 83, which are adapted respectively, according to the position of the element 1, to be engaged by an edge of said element 1 close to the point thereof, as indicated in Figs. 8 and 10. The element 1, as stated, is of tongue or arrow shape formation at its end and the two sides of the pointed end of said element 1 enter, as the case may be, between one of the rolls 39 and the shoulder 82 or 83, and serve not only to push against the pin 38 but also against said shoulder 82 or 83, and thereby release the lever 77, 78, as the case may be, so that it no longer holds the disk 37 from turning. The shoulders 80, 81 of the levers 77, 78 serve, as soon as the element 1 begins its back stroke (that is, its stroke to the left viewing Figs. 1 and 8 to 11), to engage two pins 38, being snapped thereagainst by the coil spring 79. Each shoulder 80 or 81 prevents movement of the disk 37 in one direction only. That is to say, the shoulder 80 prevents movement of the disk 37 in a contraclockwise direction, and the shoulder 81 prevents movement in a clockwise direction. The appropriate lever 77, 78 is always moved by the element 1 to release the proper shoulder 80 or 81 as the case may be, and permit the disk 37 to receive another step movement.

Figure 3:
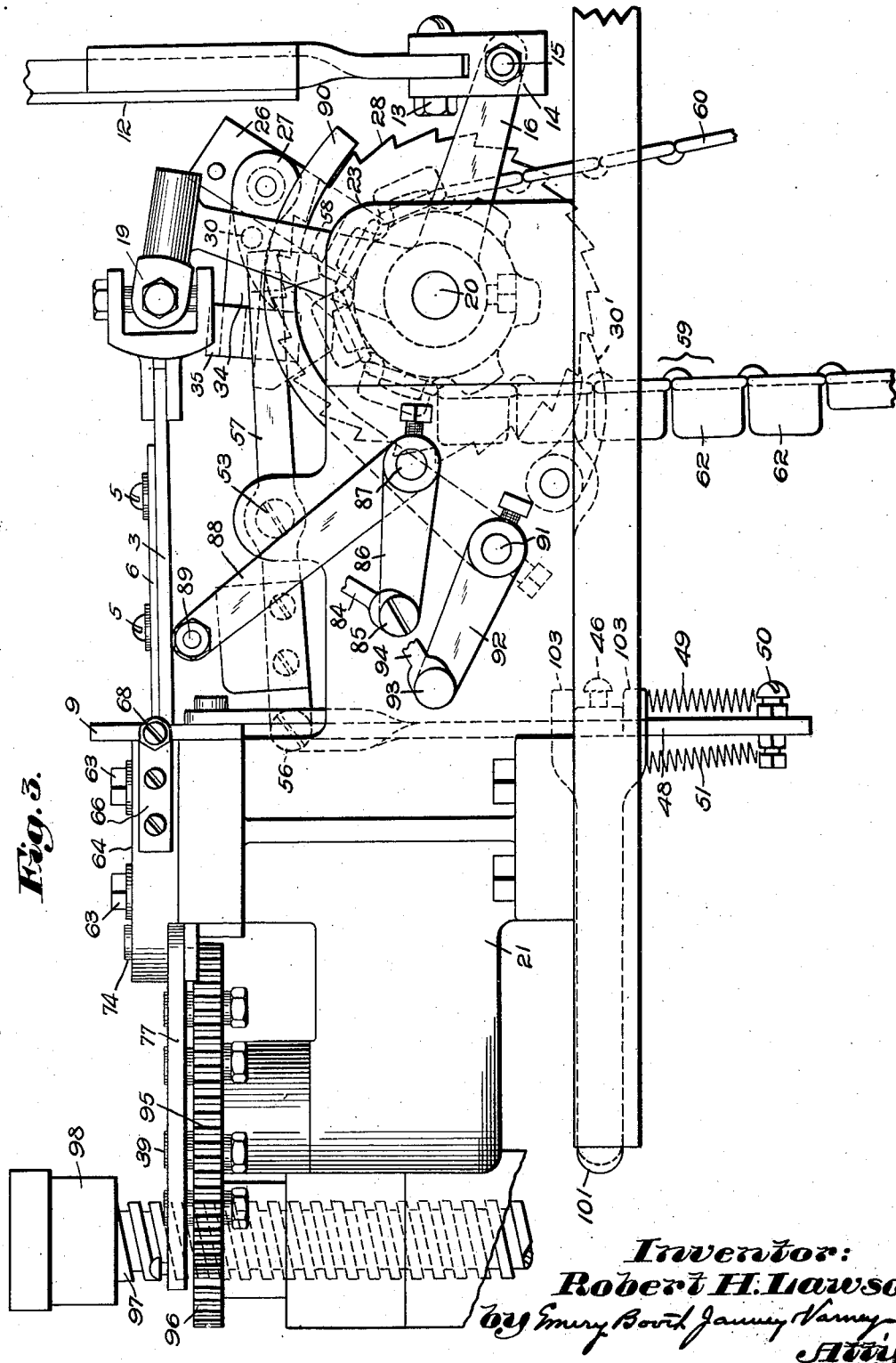
Fig. 3 is a view similar to Fig. 2 but looking at the mechanism from the back or left hand side of Fig. 1.

The element 1 may be permitted to reciprocate or move to and fro idly when in the neutral position shown in Fig. 1, and in such case to enter between and withdraw from the two pins 38 which happen to be positioned, as shown in Fig. 1, next to the pin of the element 1. I prefer, however, to provide means when the element 1 is to reciprocate or move to and fro in its neutral path, to move said element 1 away from the disk 37. In the disclosed embodiment of the invention, such movement is a lifting movement. Any suitable means may be provided for this purpose, I have, in Fig. 3, represented as broken away a rod 84. The said rod is moved in a lengthwise direction by any suitable means from the mechanism of the machine to which my invention is applied and which it is unnecessary to disclose in detail. The said link 84 is pivotally connected at 85 to a lever arm 86 pivoted at 87 upon the framing and having rigid therewith another lever arm 88 which at its upper end is provided with a cross pin 89 that takes under the element 1, so as to lift the same above the pin 38, whereupon until lowered it will move to and fro idly.

I provide any suitable means for moving one or both of the pawls 27, 34 out of action. For this purpose I have represented a curved lever arm 90, clearly shown in Fig. 2, which, when lifted, engages the pin 30 on the pawl 27 and lifts said pawl. The curved lever 90 is pivoted at 91 upon the framing, and fast therewith is another lever arm 92, to which is pivotally connected at 93 an operating rod 94, represented in Fig. 3 as broken away, but which extends to the mechanism to which my invention is attached and which is operated in accordance with the requirements of the particular machine upon which my invention is employed. For example, the operating rods 84, 94 may be moved at predetermined times from means under the control of cams on the main pattern mechanism of the machine.

The rotary step-by-step movement of the disk 37 may be utilized in any suitable manner. In the disclosed embodiment of the invention, I have represented means whereby such step-by-step movement is employed to move another element to and fro. Referring to the specific embodiment or construction herein selected for illustration of the application of my invention, the disk 37 is provided with teeth 95, with which mesh the teeth of a pinion 96 suitably supported and surrounding a screw 97, which, therefore, is moved axially in one direction or the other by the step-by-step movement of the disk 37. The screw 97 imparts movement to any suitable part or mechanism. Herein I have indicated generally at 98 a part supported upon the said screw and moved thereby.

It is sometimes desirable, when the part 98 has reached the limit of movement in either direction, to provide means to act upon the slide 11, thereby to bring it into its neutral position; that is, into the position where the element 1 will move to and fro without functioning to turn the disk 37 in either direction. For this purpose, I have indicated a lever 99 pivoted at 100 and having an arm 101 adapted to be struck at either the upper face or the lower face thereof by respective pins or projections moving with the part 98. When the lever 99 is in the horizontal position shown in Fig. 2, the slide 11 is in its central or neutral position. The lever 99 has an arm 102 forked as indicated at 103 to engage the arm 45 of the bell crank lever 42.

It will be clear from the foregoing description that the to and fro movement of the element 1 results in a step-by-step rotatory movement of the element 37, and that said element 37 is rotated in either direction as long as desired according to the dictates of the controlling means, and that said element 37 is locked or held from over movement upon each step movement so that a very great accuracy is obtained. This is of very great importance when the ultimately moved part controls some delicate mechanism.

Having thus described one illustrative embodiment of my invention, I desire it to be understood that although specific terms are employed, they are used in a generic and descriptive sense and not for purposes of limitation, the scope of the invention being set forth in the following claims.

Claims:

1. In a mechanical movement, a to and fro movable element having two functioning faces in fixed relation to each other, a rotatory element engaged by one or the other of said faces and moved step by step in either direction of rotation according to the face that is functioning to rotate said rotatory element, means to move said first element to and fro in a path across the face of said rotatory element in substantial parallelism to that face in imparting a step by step movement of rotation to the rotatory element, and means preventing over-movement of said rotatory element.

2. In a mechanical movement, a to and fro movable element, a rotatory element engaged thereby, means to move said first element to and fro in a path across the face of said rotatory element in substantial parallelism to that face in imparting a step by step movement of rotation to the rotatory element, means relatively to shift the path of movement of said first element laterally past the axis of the second element, whereby the direction of rotatory movement of the latter element is changed.

3. In a mechanical movement, to and fro movable element, a rotatory element engaged thereby, power driven means to move said first element to and fro in a predetermined path across the face of the second element in imparting rotatory movement to said second element, means relatively to shift the path of movement of said first element laterally past the axis of the second element, whereby the direction of rotatory movement of the latter element is changed, and means to prevent over-movement of said second element.

4. In a mechanical movement, a to and fro movable element, a rotatory element engaged thereby, power driven means to move said first mentioned element to and fro in a predetermined path, means relatively to shift the path of movement of said first element laterally past the axis of the second element, whereby the direction of rotatory movement of the latter element is changed, and means to lock said rotatory element at the end of each step movement thereof.

5. In a mechanical movement, a to and fro movable element, a rotatory element adapted to be engaged thereby and moved in a step-by-step manner, means to shift said first element transversely of the axis of the second element, thereby to change the direction of rotatory movement of the second element, and automatic means for controlling said shifting movement.

6. In a mechanical movement, a to and fro movable element, a rotatory element adapted to be engaged thereby, and moved in a step-by-step manner, means to shift said first element transversely of the axis of the second element, thereby to change the direction of rotatory movement to the second element, and pattern controlled means for controlling said shifting movement.

7. In a mechanical movement, a to and fro movable element, a rotatory element adapted to be engaged thereby, and moved in a step-by-step manner, means to shift said first element transversely past the axis of the second element, thereby to change the direction of rotatory movement of the second element and means to move said first element to and fro in a path across the face of said rotatory element in substantial parallelism to that face in imparting the step by step movement of rotation to the rotatory element, and means to prevent over-movement of said rotatory element.

8. In a mechanical movement, a to and fro movable element, a rotary element adapted to be engaged thereby, and moved in a step-by-step manner, means to shift said first element transversely of the axis of the second element, thereby to change the direction of rotatory movement of the second element, and means whereby the to and fro movement of said first element locks from over-movement and releases for further movement the said rotary element.

9. In a mechanical movement, a to and fro movable element, a rotatory element having a series of equally spaced projections extending from a face thereof, and means for imparting to and fro movement to the first element either in a path intersecting the axis of rotation of the second element or at one side or the other thereof.

10. In a mechanical movement, a to and fro movable element, a rotatory element having a series of equally spaced projections extending from a face thereof, and means for imparting to and fro movement to the first element either in a path intersecting the axis of rotation of the second element or at one side or the other thereof, and means whereby such paths of movement of the first element may be varied.

11. In a mechanical movement, a to and fro movable element, a rotatory element having a series of equally spaced projections extending from a face thereof, and means for imparting to and fro movement to the first element either in a path intersecting the axis of rotation of the second element or at one side or the other thereof, and pattern means for shifting the path of movement of said first element to obtain rotation in one direction or the other of said second element or to permit said second element to be idle.

12. In a mechanical movement, a reciprocatory element, a rotatory element having spaced pins upon a face thereof, means to reciprocate said first element in paths at one side or the other of the axis of said second element or in a neutral path out of contact with said pins, and means to hold said second element from over-movement.

13. In a mechanical movement, a reciprocatory element, a rotatory element having spaced pins upon a face thereof, means to reciprocate said first element in paths at one side or the other of the axis of said second element or in a neutral path out of contact with said pins, and means to lock said second element at the end of each step movement thereof.

14. In a mechanical movement, a reciprocatory element, a rotatory element having spaced pins upon a face thereof, means to reciprocate said first element in paths at one side or the other of the axis of said second element or in a neutral path out of contact with said pins, and means for periodically locking and releasing said second element.

15. In a mechanical movement, a reciprocatory element, a rotatory element having spaced pins upon a face thereof, means to reciprocate said first element in paths at one side or the other of the axis of said second element or in a neutral path out of contact with said pins, and automatic means for changing the path of movement of said first element.

16. In a mechanical movement, an element, means to impart reciprocating movement thereto in a right line, a rotatory disk having spaced pins upon a face thereof, the axis of said disk being intersected by the normal path of movement of said first element, and a slide movable transversely of the path of movement of the first element to shift said path of movement to one side or the other of the axis of said disk.

17. In a mechanical movement, an element, means to impart reciprocating movement thereto in a right line, a rotatory disk having spaced pins upon a face thereof, the axis of said disk being intersected by the normal path of movement of said first element, a slide movable transversely of the path of movement of the first element to shift said path of movement to one side or the other of the axis of said disk, and automatic means to move said slide.

18. In a mechanical movement, an element, means to impart reciprocating movement thereto in a right line, a rotatory disk having spaced pins upon a face thereof, the axis of said disk being intersected by the normal path of movement of said first element, a slide movable transversely of the path of movement of the first element to shift said path of movement to one side or the other of the axis of said disk, and pattern controlled means to move said slide.

19. In a mechanical movement, an element, means to impart reciprocating movement thereto in a right line, a rotatory disk having spaced pins upon a face thereof, the axis of said disk being intersected by the normal path of movement of said first element, a slide movable transversely of the path of movement of the first element to shift said path of movement to one side or the other of the axis of said disk, and means to lock said disk upon the completion of each step movement.

20. In a mechanical movement, an element, means to impart reciprocating movement thereto in a right line, a rotatory disk having spaced pins upon a face thereof, the axis of said disk being intersected by the normal path of movement of said first element, a slide movable transversely of the path of movement of the first element to shift said path of movement to one side or the other of the axis of said disk, means to lock said disk upon the completion of each step movement, and means to release said disk for the next ensuing step movement.

21. In a mechanical movement, a to and fro movable element power means to move said element to and fro in a predetermined path, a rotatory element adapted to be engaged by said first element and moved in a step-by-step manner, and means to shift said first element transversely of the axis of the second element, thereby to change the direction of rotatory movement of the second element.

22. In a mechanical movement, a to and fro movable element, a rotatory element adapted to be engaged thereby and moved in a step-by-step manner, means to move said first element to and fro in a path across the face of said rotatory element in substantial parallelism to that face in imparting the step by step movement of rotation to the rotary element, means relatively to shift in a transverse direction the first element and the axis of the second element, thereby to change the direction of rotatory movement of the second element.

23. In a mechanical movement, a to and fro movable element, means to move said element to and fro in a predetermined path, a rotatory element adapted to be engaged by said first element and moved in a step-by-step manner, and means to shift said first element transversely of and past the axis of the second element, thereby to change the direction of rotatory movement of the second element.

24. In a mechanical movement, a to and fro movable element having two functioning faces in fixed relation to each other, a rotatory element engaged by one or the other of said faces and moved step-by-step in either direction of rotation according to the face that is functioning to rotate said rotatory element, and means to move said first element to and fro in a path across the face of said rotatory element in substantial parallelism to that face in imparting the step-by-step movement of rotation to said rotatory element.

In testimony whereof, I have signed my name to this specification.

ROBERT H. LAWSON.